United States Patent
Nehmadi et al.

(10) Patent No.: US 12,093,834 B2
(45) Date of Patent: Sep. 17, 2024

(54) METHODS AND SYSTEMS FOR TRAINING AND VALIDATING A PERCEPTION SYSTEM

(71) Applicant: VayaVision Sensing Ltd., Or Yehuda (IL)

(72) Inventors: Youval Nehmadi, Nili (IL); Shahar Ben Ezra, Or Yehuda (IL); Shmuel Mangan, Nes Ziona (IL); Mark Wagner, Rehovot (IL); Anna Cohen, Holon (IL); Itzik Avital, Hod HaSharon (IL)

(73) Assignee: Vaya Vision Sensing Ltd., Or Yehuda (IL)

( * ) Notice: Subject to any disclaimer, the term of this patent is extended or adjusted under 35 U.S.C. 154(b) by 255 days.

(21) Appl. No.: 17/762,345

(22) PCT Filed: Sep. 22, 2020

(86) PCT No.: PCT/IL2020/051028
§ 371 (c)(1),
(2) Date: Mar. 21, 2022

(87) PCT Pub. No.: WO2021/053680
PCT Pub. Date: Mar. 25, 2021

(65) Prior Publication Data
US 2022/0335729 A1      Oct. 20, 2022

Related U.S. Application Data

(60) Provisional application No. 62/903,846, filed on Sep. 22, 2019.

(51) Int. Cl.
*G06N 3/088* (2023.01)
*G06V 10/25* (2022.01)
(Continued)

(52) U.S. Cl.
CPC ............ *G06N 3/088* (2013.01); *G06V 10/25* (2022.01); *G06V 10/764* (2022.01);
(Continued)

(58) Field of Classification Search
CPC ........ G06N 3/045; G06N 3/088; G06V 10/25; G06V 10/764; G06V 10/774;
(Continued)

(56) References Cited

U.S. PATENT DOCUMENTS

| RE46,930 E | 7/2018 | Mimeault |
|---|---|---|
| RE47,134 E | 11/2018 | Mimeault |

(Continued)

FOREIGN PATENT DOCUMENTS

| JP | 2018-032074 | 3/2018 |
|---|---|---|
| WO | WO 2019/178253 | 9/2019 |
| WO | WO 2019177562 | 9/2019 |

OTHER PUBLICATIONS

International Preliminary Report on Patentability in International Appln. No. PCT/IL2020/051028, mailed on Mar. 31, 2022, 10 pages.

(Continued)

*Primary Examiner* — Manuchehr Rahmjoo
(74) *Attorney, Agent, or Firm* — Fish & Richardson P.C.

(57) ABSTRACT

A perception system, comprising a set of reference sensors; a set of test sensors and a computing device, which is configured for receiving first training signals from the set of reference sensors and receiving second training signals from the set of test sensors, the set of reference sensors and the set of test sensors simultaneously exposed to a common scene; processing the first training signals to obtain reference images containing reference depth information associated with the scene; and using the second training signals and the reference images to train a neural network for transforming (Continued)

subsequent test signals from the set of test sensors into test images containing inferred depth information.

20 Claims, 13 Drawing Sheets

(51) Int. Cl.
    *G06V 10/764*      (2022.01)
    *G06V 10/774*      (2022.01)
    *G06V 10/776*      (2022.01)
    *G06V 10/82*      (2022.01)
    *G06V 20/58*      (2022.01)

(52) U.S. Cl.
    CPC .......... *G06V 10/774* (2022.01); *G06V 10/776* (2022.01); *G06V 10/82* (2022.01); *G06V 20/58* (2022.01)

(58) Field of Classification Search
    CPC ............. G06V 10/776; G06V 10/7792; G06V 10/803; G06V 10/82; G06V 20/58
    See application file for complete search history.

(56) References Cited

U.S. PATENT DOCUMENTS

| | | | |
|---|---|---|---|
| 10,444,357 | B2 | 10/2019 | Nehmadi et al. |
| 10,460,208 | B1 * | 10/2019 | Atsmon ................. G06V 20/64 |
| RE48,763 | E | 10/2021 | Mimeault |
| 11,226,413 | B2 | 1/2022 | Nehmadi et al. |
| RE48,914 | E | 2/2022 | Mimeault et al. |
| 11,292,483 | B2 | 4/2022 | Nehmadi et al. |
| 11,402,510 | B2 | 8/2022 | Baribault |
| 2014/0078265 | A1 | 3/2014 | Ohba et al. |
| 2015/0055821 | A1 | 2/2015 | Fotland |
| 2016/0291154 | A1 | 10/2016 | Nehmadi et al. |
| 2016/0291155 | A1 | 10/2016 | Nehmadi et al. |
| 2018/0232947 | A1 | 8/2018 | Nehmadi et al. |
| 2019/0116322 | A1 | 4/2019 | Holzer et al. |
| 2019/0266418 | A1 | 8/2019 | Xu et al. |
| 2019/0324147 | A1 | 10/2019 | Day et al. |
| 2020/0062273 | A1 | 2/2020 | Nehmadi et al. |
| 2021/0080575 | A1 | 3/2021 | Nehmadi et al. |
| 2021/0129868 | A1 | 5/2021 | Nehmadi |
| 2021/0293963 | A1 | 9/2021 | Nehmadi et al. |
| 2022/0026539 | A1 | 1/2022 | Bernier et al. |
| 2022/0026540 | A1 | 1/2022 | Olivier |
| 2022/0026573 | A1 | 1/2022 | Baribault et al. |
| 2022/0026576 | A1 | 1/2022 | Baribault et al. |
| 2022/0137214 | A1 | 5/2022 | Nehmadi et al. |
| 2022/0229190 | A1 | 7/2022 | Nehmadi et al. |

OTHER PUBLICATIONS

International Search Report and Written Opinion in International Appln. No. PCT/IL2020/051028, mailed on May 6, 2021, 12 pages.

Rosique et al., "A Systematic Review of Perception System and Simulators for Autonomous Vehicles Research," Sensors, Feb. 2019, 19(3):648, 29 pages.

Li, et al., "Visual Recognition in RGB Images and Videos by Learning from RGB-D Data", IEEE Transactions on Pattern Analysis and Machine Intelligence, USA, IEEE, Aug. 2, 2017, vol. 40, No. 8, pp. 2030-2036.

Melotti, et al., "CNN-LIDAR pedestrian classification: combining range and reflectance data", 2018 IEEE International Conference on Vehicular Electronics and Safety (ICVES), USA, IEEE, Sep. 12, 2018, pp. 1-6.

Tzeng, et al., "Adversarial Discriminative Domain Adaptation",2017 IEEE Conference on Computer Vision and Pattern Recognition (CVPR), USA, IEEE, Jul. 21, 2017, pp. 2962-2971.

Zhu, et al., "Boosted Cross-Domain Dictionary Learning for Visual Categorization", IEEE Intelligent Systems, USA, IEEE, Mar. 18, 2016, vol. 31, No. 3, pp. 6-18.

JP Office Action in Japanese Appln. No. 2022-543814, mailed on Jun. 4, 2024, 10 pages (with English translation).

* cited by examiner

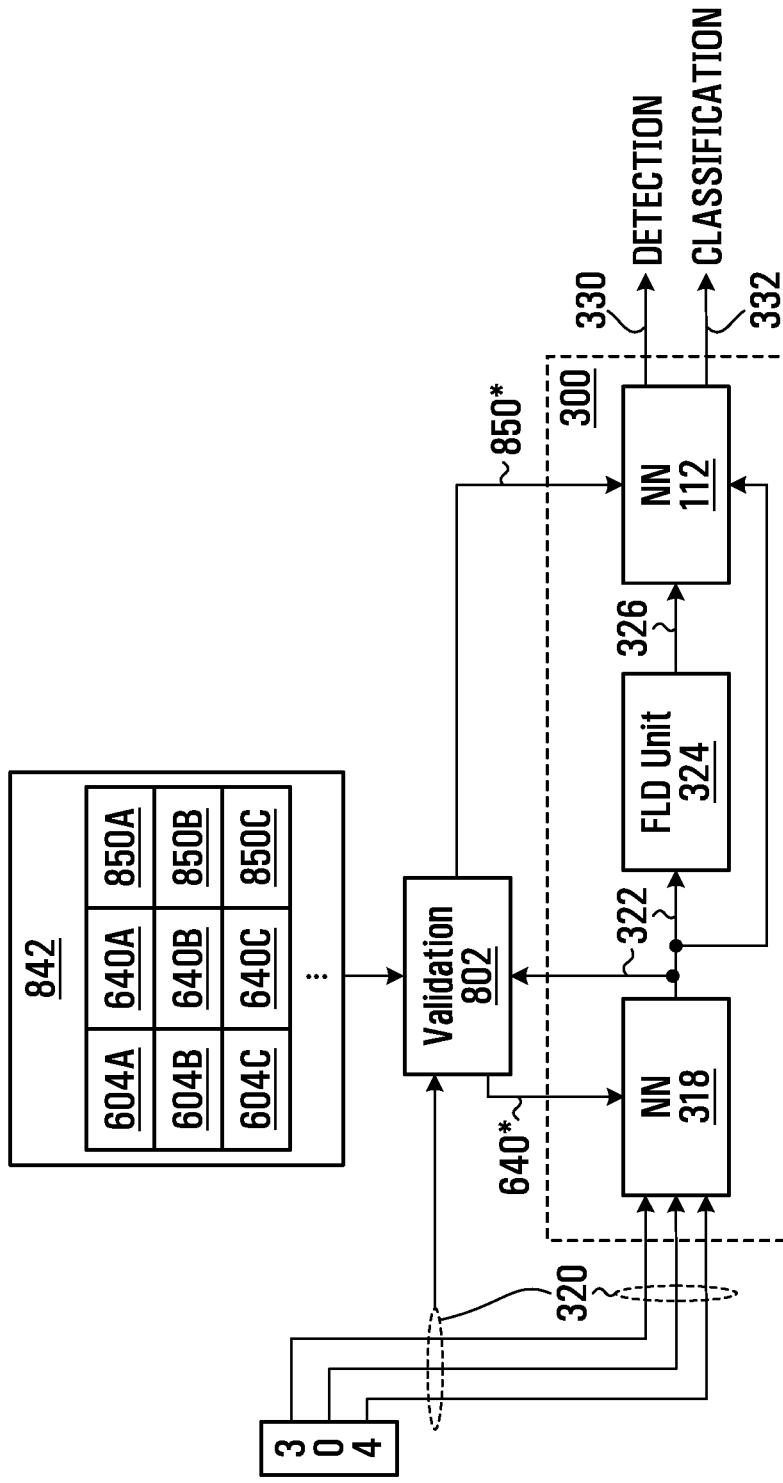

METHODS AND SYSTEMS FOR TRAINING AND VALIDATING A PERCEPTION SYSTEM

CROSS-REFERENCE TO RELATED APPLICATION

The present application is the national stage entry of International Patent Application No. PCT/IL2020/051028, filed on Sep. 22, 2020, which claims the benefit of priority under 35 U.S.C. 119(e) of U.S. Provisional Application No. 62/903,846, filed on Sep. 22, 2019, the disclosures of which are expressly incorporated herein in its entirety by reference thereto.

FIELD

The present disclosure relates generally to a system for perception objects, such as in the context of autonomous driving, and particularly to methods and systems for training and validating such a system.

BACKGROUND

The introduction of deep neural networks has made possible impressive advances in performance on a wide range of detection and classification problems. This is particularly advantageous for the perception of objects on a roadway, such as in the context of autonomous driving. However, there are constraints on the use of neural networks in an autonomous driving scenario. These constraints come in the form of latency and electrical power, which require that sacrifices be made regarding computational complexity and the size of the training set. In short, the resources needed to fully implement high-performance deep neural networks are not available in autonomous vehicles. Another factor is the cost and availability of the sensors that provide the inputs processed by the perception software; in many cases, the sensors with the most accurate readings may be too costly to implement in a vehicle sold to the public.

In summary, autonomous vehicles are faced with perception challenges that are ideally suited to high-performance neural networks, yet such neural networks are hardly implementable in a commercially viable product. It would therefore be desirable to harness certain advantages of neural networks using available vehicle-grade computing hardware and relatively economic sensors.

SUMMARY

According to a first broad aspect, there is provided a computer-implemented method, comprising:
  processing an image containing depth information to identify regions of interest in the image that contain an unspecified object meeting certain criteria;
  processing the identified regions of interest using a neural network trained to detect and classify known objects in a scene; and
  outputting an object descriptor and an indication of a location in the image of the objects detected and classified by the neural network.

According to another broad aspect, there is provided a perception system, comprising: a memory storing computer-readable instructions; an input/output; and a processing entity connected to the memory and to the input/output. The processing entity is configured to carry out the computer-readable instructions for:
  receiving an image containing depth information via the input/output;
  processing the image to identify regions of interest in the image that contain an unspecified object meeting certain criteria;
  processing the identified regions of interest using a neural network trained to detect and classify known objects in a scene; and
  outputting via the input/output an object descriptor and an indication of a location in the image of the objects detected and classified by the neural network.

According to another broad aspect, there is provided a computer-implemented method, comprising:
  receiving first training signals from a set of reference sensors and receiving second training signals from a set of test sensors, the set of reference sensors and the set of test sensors simultaneously exposed to a common scene;
  processing the first training signals to obtain reference images containing reference depth information associated with said scene;
  using the second training signals and the reference images to train a neural network for transforming subsequent test signals from the set of test sensors into test images containing inferred depth information.

According to another broad aspect, there is provided a perception system, comprising:
  a set of reference sensors;
  a set of test sensors; and
  a computing device configured for:
    receiving first training signals from the set of reference sensors and receiving second training signals from the set of test sensors, the set of reference sensors and the set of test sensors simultaneously exposed to a common scene;
    processing the first training signals to obtain reference images containing reference depth information associated with said scene; and
    using the second training signals and the reference images to train a neural network for transforming subsequent test signals from the set of test sensors into test images containing inferred depth information.

According to another broad aspect, there is provided a computer-implemented method, comprising:
  using a neural network to transform real-time signals obtained from a set of test sensors into images containing depth information, the neural network being characterized by a set of neural network parameters;
  computing feature characteristics of the real-time signals and/or the images, the feature characteristics being test feature characteristics;
  validating performance of the neural network based on comparing the test feature characteristics to reference feature characteristics, the reference feature characteristics being associated with the set of neural network parameters; and
  outputting a signal indicative of an outcome of said validating.

According to another broad aspect, there is provided a perception system, comprising:
  a set of test sensors;
  a computing device configured for:
    using a neural network to transform real-time signals obtained from the set of test sensors into images containing depth information, the neural network being characterized by a set of neural network parameters;

computing feature characteristics of the real-time signals and/or the images, the feature characteristics being test feature characteristics;

validating performance of the neural network based on comparing the test feature characteristics to reference feature characteristics, the reference feature characteristics being associated with the set of neural network parameters; and outputting a signal indicative of an outcome of said validating.

According to another broad aspect, there is provided a computer-implemented method, comprising:

transforming signals obtained from a set of first sensors into first images containing depth information;

processing the first images to identify regions of interest that contain unspecified objects meeting certain criteria;

carrying out first detection and classification of known objects in the regions of interest of the first images;

using a neural network to transform signals obtained from a set of second sensors into second images containing depth information;

processing the second images to identify regions of interest that contain unspecified objects meeting said criteria;

carrying out second detection and classification of known objects in the regions of interest of the second images; and validating performance of the neural network based on outcomes of the first object detection and classification and the second object detection and classification.

According to another broad aspect, there is provided a perception system, comprising:

a set of first sensors;

a set of second sensors;

a computing device configured for:

transforming signals obtained from the set of first sensors into first images containing depth information;

processing the first images to identify regions of interest that contain unspecified objects meeting certain criteria;

carrying out first detection and classification of known objects in the regions of interest of the first images;

using a neural network to transform signals obtained from the set of second sensors into second images containing depth information;

processing the second images to identify regions of interest that contain unspecified objects meeting said criteria;

carrying out second detection and classification of known objects in the regions of interest of the second images;

validating performance of the neural network based on outcomes of the first object detection and classification and the second object detection and classification.

BRIEF DESCRIPTION OF THE DRAWINGS

These and other aspects will now be described in conjunction with the accompanying drawings, in which:

FIG. 8A is a block diagram of a perception system and a validation unit, in accordance with another non-limiting embodiment.

DETAILED DESCRIPTION

Figure 1:
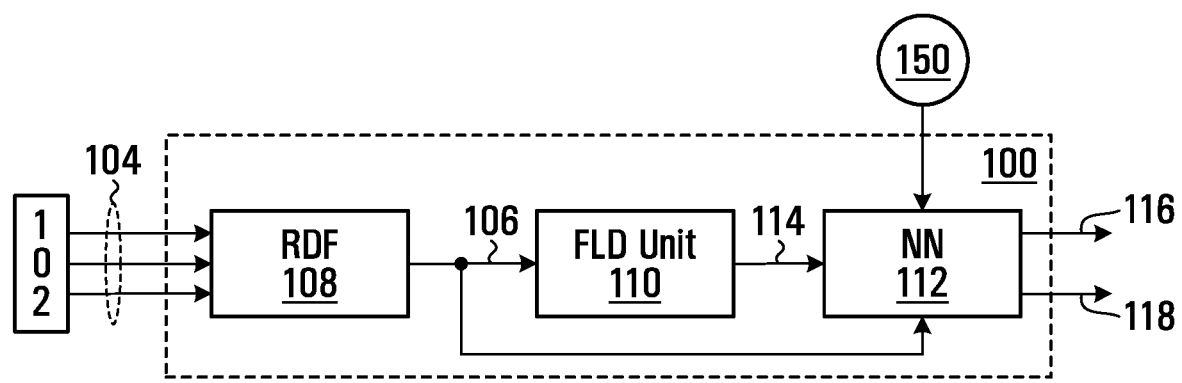
FIG. 1 is a block diagram of a perception system, in accordance with a non-limiting embodiment.

FIG. 1 illustrates an example of a perception system 100 in accordance with a specific non-limiting embodiment. The perception system 100 is operatively coupled to a plurality of sensors 102 that produce sensor signals 104.

The sensors 102 may include active sensors (in which a reflected signal is analyzed and compared to a signal transmitted by a source) and passive sensors (in which there is no purposefully transmitted signal). Examples of active sensors may include lidar, radar and sonar, to name a few non-limiting possibilities. Lidar may include directed-beam lidar and/or flash lidar. Lidar may include mechanical (e.g., rotating) lidar as well as solid state lidar. Solid state lidar may involve a beam of light steered by a micro-electromechanical system (MEMS) and/or using a liquid crystal phase grating (LCPG) as described in U.S. Pat. Nos. 8,982,313 and/or 9,195,092, hereby incorporated by reference herein. Examples of passive sensors may include cameras, microphones and vibration sensors, to name a few possibilities.

In some embodiments, the perception system 100 may be implemented as a computing device that implements a plurality of functional units. Specifically, the functional units may include a raw data fusion (RDF) unit 108, a first-level detection (FLD) unit 110 and a neural network 112.

The RDF unit 108 may carry out raw data fusion on a plurality of signals received from a variety of sensors. In particular, the RDF unit 108 is configured for processing the sensor signals 104 to produce an image signal 106. In some embodiments, raw data fusion may involve producing a high-resolution composite image from multiple images, such as lidar images, radar images and camera images, some of which may be lower-resolution images.

Generally speaking, the image signal 106 produced by the RDF unit 108 may contain images that encode both color information and depth information. In some specific non-limiting embodiments, the images containing depth information may be RGBD images, i.e., images that include color information and depth information for each pixel. In some specific non-limiting embodiments, the images containing depth information may be RGBDV images, i.e., images that include color information, depth information and also velocity (or motion) information for each pixel. Such images are sometimes referred to as a "map". RGBDV may be an efficient way to encode 3D object information.

In some embodiments, in order to produce the images containing depth information, the RDF unit 108 may apply image processing techniques to the sensor signals 104, such as one or more of upsampling, downsampling, interpolation, projection, compression, decompression and image warping, to name a few non-limiting possibilities. Example implementations of raw data fusion are described in, for example, including U.S. Pat. No. 10,445,928 to Vayavision Sensing Inc. and U.S. Pat. No. 10,468,062 to Zoox Inc., both of which are hereby incorporated by reference herein. In other embodiments, the RDF unit 108 may implement a neural network. In still other embodiments, the sensors 102 are integrated with the RDF unit 108 into an RGBD camera, as described in Fossati et al., Consumer Depth Cameras for Computer Vision: Research Topics and Applications, 2013, hereby incorporated by reference herein. In further embodiments, the RDF unit 108 may carry out an algorithm for estimating velocity from an RGBD sensor, as in P. Kim, H. Lim and H. J. Kim, "6-DoF velocity estimation using RGB-D camera based on optical flow," 2014 *IEEE international Conference on Systems, Man, and Cybernetics (SMC)*, San Diego, CA, 2014, pp. 4008-4013, hereby incorporated by reference herein.

The FLD unit 110 is configured for processing the image signal 106 to produce an object signal 114, which is fed to the neural network 112. In particular, the FLD unit 110 may be configured for processing the image containing depth information to identify regions of interest (ROIs) in the image that contain unspecified objects meeting certain criteria. Unspecified objects can be objects that are detected but unrecognized or unclassified. The ROIs containing such objects are then encoded into the object signal 114.

As such, the FLD unit 110 may be configured to detect without the need to classify or label. For example, the FLD unit 110 receives an image signal that may be an RGBDV signal. The FLD unit 110 may apply direct detection using 3D object information encoded in RGBDV signal or map. This may be an efficient way to capture the physics of the problem and feed it into the computational engine of the neural network 112. In an embodiment, detection operation of the FLD unit 110 may be unsupervised. The FLD unit 110 is configured to detect objects in a drivable area (e.g., a roadway) that meet certain criteria. The criteria may comprise the object having a height greater than a predetermined minimum height. Since by virtue of its operation, the FLD unit 110 may detect objects not previously encountered, and under conditions not previously categorized, the objects detected by the FLD unit 110 may be referred to as "unspecified". From a received RGBDV image, the FLD unit 110 is configured to calculate a per-pixel height map. The height map may be represented as an array that has the same X and Y dimensions as the RGBDV image, and where the value of the element corresponding to a particular X and Y position represents the detected height of that pixel above the roadway. A detection threshold on the height map identifies objects that may affect the driving path. Any appropriate algorithm from the apparatus of computer vision detection can be used to threshold the height map. As such, objects low enough to be safely driven over, do not affect the driving path. Of course, more sophisticated object detection algorithms may be used to lower the incidence of false positives. In an autonomous driving scenario, the detection threshold may be dynamic, and made to depend on the features of vehicle to which the perception system 100 is mounted, so as to accommodate different ground clearances. Also, other criteria may be used, such as estimated object volume.

The neural network 112 is configured for processing the object signal 114 to produce a detection signal 116 and a classification signal 118. For example, the neural network 112 may be configured to process the ROIs identified in the object signal 114 using a parametrized machine learning model trained to detect and classify known objects in a scene. In FIG. 1, the parameters used by the neural network 112 are denoted 150.

The detection signal 116 may comprise an object descriptor and the classification signal 118 may comprise an indication of a location in the image of the objects detected and classified by the neural network 112. The object descriptor and the indication of location may be displayed on a display, stored in a memory and/or fed to other functional units, such as a path planning and decision making unit, for example.

As a result, the neural network 112 may perform its detection and classification operations on objects having a height greater than the predetermined minimum height. This may allow the complexity of the neural network 112 to be kept low. For example, where the neural network is implemented as a convolutional neural network (CNN), the number of convolution layers may be kept small (e.g., 1 or 2), as there is an implicit reduction in the number of possible variations in the labelled training data. For example, supervised neural network detection requires large amounts of labelled (classified) training data. Labelling needs to cover a huge variety of different circumstances. It is not enough to label "cars". There is a need to label cars of different types, seen from different perspectives, with different levels of occlusion, and under different conditions of light and weather. By implementing the FLD unit 110 as a precursor stage to the neural network 112, the universe of possible outputs is narrowed. For example, though an object may be large, if it is thin and laying flat on the ground, it would not need to be detected or classified by the neural network 112, as it would not be identified by the FLD unit 110 in the object signal 114 sent to the neural network 112.

The object descriptor output by the neural network 112 may include an object class (e.g., car, truck, person, bicycle, building, vegetation, etc.) or sub-class (e.g., for the "car" class, sub-classes may be "autonomous car" or "human-driven car"; for the "person" class, sub-classes may be "stationary", "walking", "running"; etc.) Other examples of classes and sub-classes are of course possible.

The object descriptor output by the neural network 112 may also include an indication of depth (e.g., a depth value), an estimation of volume, an estimation of speed and direction, and so on.

The indication of the location of one or more objects in a given image, as output by the neural network 112, may include bounding boxes within the image. Each bounding box may surround a corresponding object associated with an object descriptor. The bounding box may be a 2D bounding box or a 3D bounding box, for example. In other cases, the indication of the location of the one or more objects in the image may take the form of a silhouette, cutout or segmented shape.

The object descriptor may be displayed along with the associated bounding box, or it may be stored in memory in together with the associated bounding box.

In some cases, all of the unspecified objects identified by the FLD unit 110 are detected and classified by the neural network 112, i.e., there is sufficient training data to recognize all possible objects in the object signal from the FLD unit 110. However, in some cases, the unspecified objects detected by the FLD unit 110 include objects that the neural network 112 is incapable of classifying. In this case, the neural network 112 may output a signal indicating that one or more objects identified by the FLD unit 110 were not classified by the neural network. This provides the perception system 100 with a "fall-back", whereby objects that are on the roadway and present a potential danger (due to their height or other criteria) will always be identified (i.e., by the FLD unit 110), even though the neural network 112 may not be successful in classifying them.

The neural network 112 may be trained during a training phase. This may involve feedforward of data signals to generate the output and then the backpropagation of errors for gradient descent optimization. For example, in some embodiments, the neural network 112 may be trained by using a set of reference images and reference data about the objects and classes of objects in the reference images. That is to say, the neural network 112 is fed a plurality of reference images and is provided with the "ground truth" (i.e., is told what objects and classes of objects are in the reference images and where they appear in the reference images) so that the neural network 112 is trained to recognize (i.e., detect and classify) those objects in images other than the reference images such as the regions of interest supplied by the FLD unit 110. Training results in converging on the set of parameters 150.

Additional information on object classes, bounding boxes and training a neural network for object detection in an autonomous vehicle context may be found in Pendleton et al., "Perception, Planning, Control, and Coordination for Autonomous Vehicles", *Machines* 2017, 5(1), 6, hereby incorporated by reference herein.

It should be appreciated that the FLD unit 110 does not require training in order to be able to detect unspecified or unexpected objects, that is, objects that are outside the training set for the neural network 112. This may allow the training set for the neural network 112 to be reduced and may allow the neural network 112 to be more computationally efficient when operating in real-time.

The use of direct detection during training is a way of automating labeling and may contribute to the manufacturability and real-time usability of the neural network 112.

It is noted that where the neural network 112 is implemented as a convolutional neural network (CNN), introducing the FLD unit 110 reduces the number of convolutional layers in the CNN (i.e., the "depth" of a deep neural network—DNN), by focusing the learning on specific parts of the image (i.e., in the ROIs). Another way to view the effect of providing first-level level detection is in terms of providing a default classification that an object exists. The neural network 112 may be able to refine the classification to car, pedestrian and so on, but if it cannot, the default existence classification provides a critical safety net. This can be particularly important during pilot and ramp-up, or the introduction of new driving scenarios, when a full training set with labels for all possible objects and events may not exist.

Figure 2:
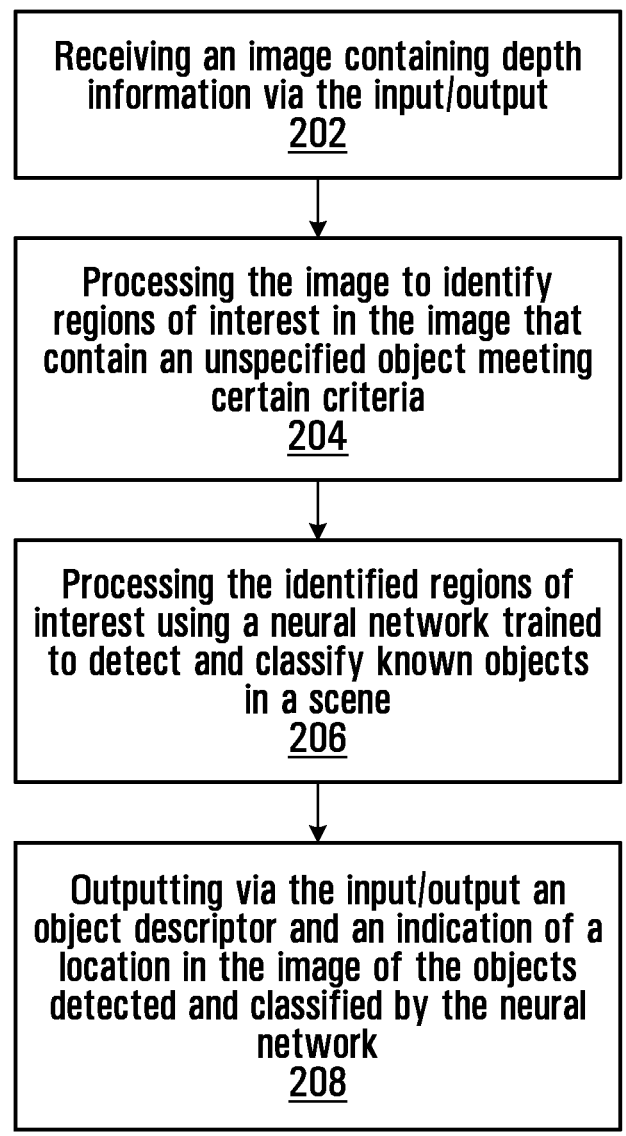
FIG. 2 is a flowchart illustrating steps in a method that may be carried out by elements of the perception system of FIG. 1, in accordance with a non-limiting embodiment.

As such, there has been provided a perception system that comprises a memory storing computer-readable instructions, an input/output and a processing entity connected to the memory and to the input/output. With reference to FIG. 2, such processing entity is configured to carry out the computer-readable instructions for: receiving an image containing depth information via the input/output 202; processing the image to identify regions of interest in the image that contain an unspecified object meeting certain criteria 204; processing the identified regions of interest using a neural network trained to detect and classify known objects in a scene 206; and outputting via the input/output an object descriptor and an indication of a location in the image of the objects detected and classified by the neural network 208.

Figure 3A:
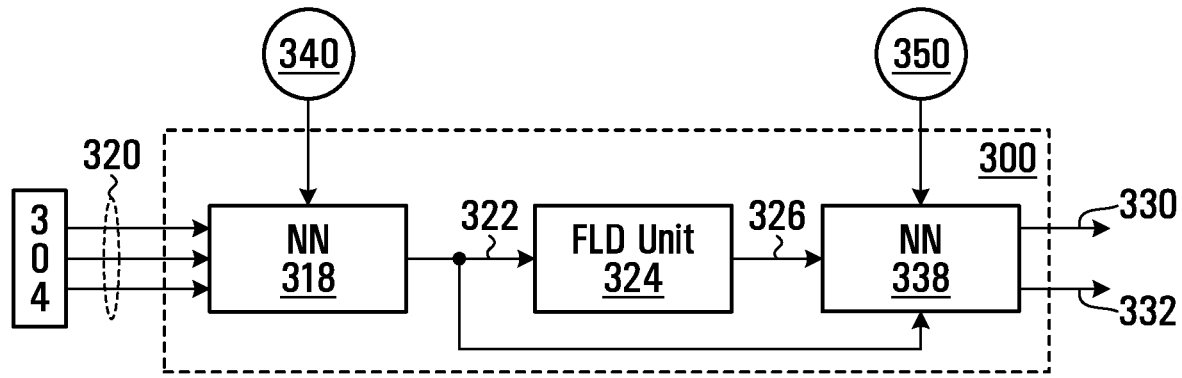
FIG. 3A is a block diagram of a perception system, in accordance with a non-limiting embodiment.
Figure 3B:
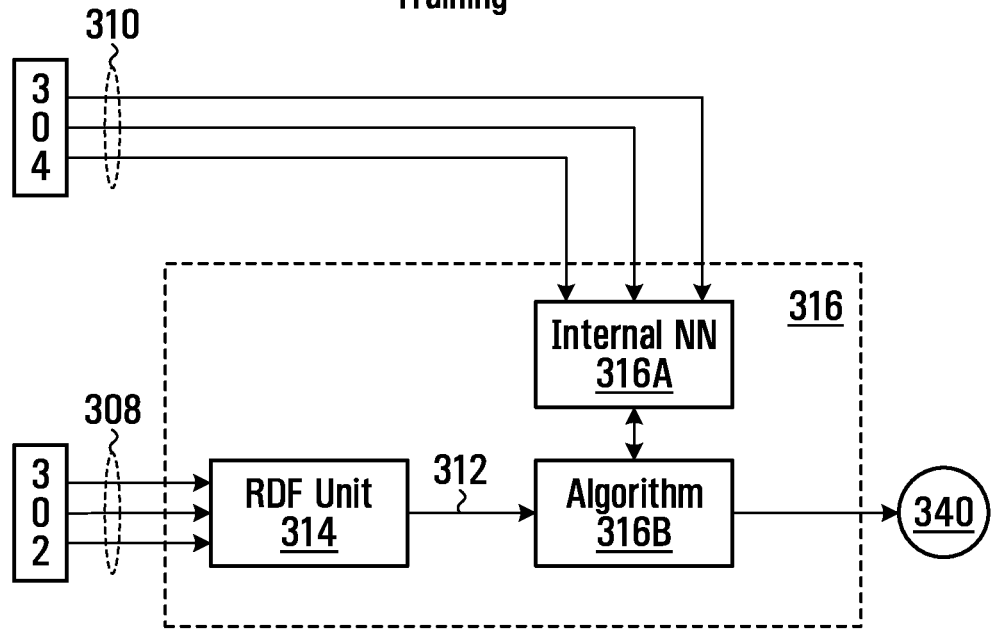
FIG. 3B is a block diagram of a training unit for training the perception system of FIG. 3A, in accordance with a non-limiting embodiment.

The present disclosure covers variants of the perception system 100. With reference to FIGS. 3A and 3B, there will now be described an example perception system 300 and an example training unit 316 for training the perception system 300, in accordance with a specific non-limiting embodiment.

Specifically, with reference to FIG. 3A, the perception system 300 is configured to receive test signals 320 from a set of production sensors 304. With reference to FIG. 3B, the training system 316 is configured to receive first training signals 308 from a set of reference sensors 302 and is also configured to receive second training signals 310 from the production sensors 304. It is noted that the production sensors 304 output both the test signals 320 and the second training signals 310, the difference being that the signals output by the production sensors 304 are referred to as the "second training signals" 310 during a training phase, and are referred to as the "test signals" 320 during a real-time scenario.

The reference sensors 302 may be high-quality sensors that are able to produce accurate RGBDV images covering a wide range of driving scenarios, whereas the production sensors 304 may be lower-cost sensors more suitable for use in a commercial product or real-time environment. As such, the reference sensors 302 are sometimes referred to as "ground truth sensors" and the production sensors 304 are sometimes referred to as "high-volume manufacturing (HMV) sensors" or "test sensors". In the case of lidar, for example, a lidar sensor that is used as a reference sensor may have a higher resolution, greater field of view, greater precision, better SNR, greater range, higher sensitivity and/or greater power consumption than a production version of this lidar sensor. To take a specific example, the set of reference sensors 302 may include a lidar covering a 360° field of view, with an angular resolution of 0.1°, and range of 200 m, whereas the set of production sensors 304 may include a lidar covering a 120° field of view, with an angular resolution of 0.5° and range of 100 m, together with a radar covering a 120° field of view, with an angular resolution 2° and a range of 200 m.

As such, the set of production sensors 304 may differ from the set of reference sensors 302. In particular, the production sensors 304 and the reference sensors 302 may be of different types. In other cases, the set of production sensors 304 is a subset of the set of reference sensors 302, i.e., the set of reference sensors 302 may include sensors that are not in the set of production sensors 304, or vice versa.

The set of reference sensors 302 and/or the set of production sensors 304 may include various combinations of sensors such as one or more lidar sensors and one or more non-lidar sensors such as a radar sensor, a camera and/or an acoustic sensor (e.g., sonar). The presence of lidar may be particularly suitable for applications wherein the production sensors 304 are to be mounted to a vehicle, such a land, water or airborne vehicle.

With reference to FIG. 3B, the training unit 316 is used for training the perception system 300 during a training phase. In particular, the training unit 316 receives the first training signals 308 from the reference sensors 302 and processes them to obtain reference images 312 containing reference depth information associated with the scene. To this end, the training unit 316 may implement a raw data fusion (RDF) unit 314, which may be similar or identical to the RDF unit 108 described above in the context of the perception system 100. As such, a detailed description of the RDF unit 314 is not required here.

The training unit 316 is configured to process (i) the reference images 312 received from the RDF unit 314 and (ii) the second training signals 310 received from the production sensors 304 to produce a set of parameters 340, which are used by a neural network 318 of the perception system 300 during a real-time scenario (see FIG. 3A).

Specifically, during a real-time scenario that follows the training phase, the neural network 318 is configured to transform test signals 320 received from the production sensors 304 into test images 322, based on the parameters 340 that were determined during the training phase. In some embodiments, the test images 322 may be RGBD images, i.e., images that include color information and depth information for each pixel, whereas in other embodiments, the test images 322 may be RGBDV images, i.e., images that include color information, depth information and velocity information for each pixel.

In general, the parameters 340 can represent any variable quantity that is used by the neural network 318 in transforming the test signals 320 into the test images 322 containing depth and/or speed information. In one embodiment, the parameters include weights that attribute a different relative importance to each of the production sensors 304 in the creation of the test images 322. In other embodiments, the parameters include weights and bias values applied to different nonlinear functions of the test signals 320 so as to result in neural-network-assisted data fusion.

In a specific non-limiting embodiment, the neural network 318 is a convolutional neural network (CNN). A CNN is parametrized by its weights vector q=[W; b], where W is the set of weights governing the inter-neural connections and b is the set of neuron bias values. The set of weights W is organized as image filters, with coefficients learned during training. Convolutional layers within a CNN exploit local spatial correlations of image pixels to learn translation-invariant convolution filters, which capture discriminant image features. Further information about the implementation of Convolutional Neural Networks (CNN), Recurrent Neural Networks (RNN) and Deep Reinforcement Learning (DRL) can be found in Grigorescu et al., "A Survey of Deep Learning Techniques for Autonomous Driving", *Journal of Field Robotics*, Volume 37, Issue 3, April 2020, pp. 362-386, hereby incorporated by reference herein.

In some embodiments, the neural network 318 is associated with a single set of parameters 340, whereas in other embodiments, the neural network 318 may be associated with plural sets of parameters 340 for different conditions based on factors such as ambient light level and weather conditions, for example.

Continuing with the description of the perception system 300, the test images 322 are provided to a first-level detection (FLD) unit 324, which may be similar or identical to the FLD unit 110 that was described above in the context of the perception system 100. As such, no further description of the FLD unit 324 is required. Suffice it to say that the FLD unit 324 may be configured for processing the test images 322 containing depth information to identify regions of interest (ROIs) in the image that contain unspecified objects meeting certain criteria. As such, the identified objects are indicated by an object signal 326, which is fed by the FLD unit 324 to a neural network 338. Since there are two neural networks in the perception system 300, neural network 318 will be referred to as the "first neural network" and neural network 338 will be referred to as the "second neural network".

The second neural network 338 receives the object signal 326 from the FLD unit 324 and also receives the test images 322 from the first neural network 318. The second neural network 338 is configured for processing the object signal 326, based on the test images 322, to produce a detection signal 330 and a classification signal 332. The second neural network 338 can be similar or identical to the neural network 112 described above in connection with FIG. 1. In the present embodiment, the second neural network 338 is configured to process the ROIs identified in the object signal 326 based on a second set of parameters 350 obtained during a training phase for detecting and classifying known objects in a scene.

The detection signal 330 may comprise an object descriptor and the classification signal 332 may comprise an indication of a location in the test images 322 of the objects detected and classified by the second neural network 338. The object descriptor and the indication of location may be displayed on a display, stored in a memory and/or fed to other functional units, such as a path planning and decision making unit, for example.

One motivation of the present embodiment is to resolve the conflict between the need for sensor accuracy (such as is obtained through the use of the reference sensors 302) and the need for an economic solution by using mass-produced sensors (i.e., the production sensors 304). This may be achieved by training the perception system 300 so that its behavior in processing future test signals 320 from the production sensors 304 (in the absence of the first training signals 308 from the reference sensors 302) will approximate its past behavior when the second training signals 310 similar to the test signals 320 were processed in the presence of the first training signals 308 from the reference sensors 302. In particular, this involves the training unit 316 training the first neural network 318 during a training phase.

Specifically, with reference to FIG. 3B, the reference sensors 302 and the production sensors 304 are exposed to a common scene during the training phase. As such, the reference images 312 contain reference depth information associated with the scene. The reference depth and speed information contained in the reference images 312 can be referred to as the "ground truth" for the various objects in the scene, as the information is obtained from high-quality sensors and is known to be accurate.

As the ground truth is generated automatically, at will, there is no need for a complex, massive labelling operation of the kind often required by deep neural networks. Rather, the present embodiment combines the ease of use benefits of unsupervised learning with the accuracy and high performance of supervised learning. A second way in which this embodiment differs from conventional schemes, is that the learning is of measurable physical quantity (distance or velocity), which exists in every image, and can therefore be learned from a modest number of reference images. This is in contrast to learning a classification, such as "pedestrians crossing roads", so there is no requirement that the training set (labelled set) includes a wide variety of scenarios, many of which may appear with rather low probability. Finally, the reference images 312 containing the ground truth do not have to be generated in real-time. It is a low frequency operation, with no safety implications, and can be done with conventionally available amounts of computing power.

The RDF unit 314 of the training unit 316 generates the reference images 312. In addition, the training unit 316 receives the second training signals 310 from the production sensors 304, which are sensing the same scene at the same time as the reference sensors 302. The training unit 316 is configured to implement an "internal neural network" 316A that has the same structure as the first neural network 318. As such, the internal neural network 316A is configured to transform the second test signals 310 into images (hereinafter "internal images") based on a set of neural network parameters (hereinafter "internal parameters"). It should be understood that the internal neural network 316A and the first neural network 318 need not be distinct neural networks, but rather may correspond to the same block of software code, which is referred to as the internal neural network 316A during the training phase and as the first neural network 318 during real-time use.

In an embodiment, the training unit 316 implements an algorithm block 316B that iteratively changes the internal parameters of the internal neural network 316A so as to minimize an error, such as the error between the reference images 312 (which contain ground truth depth information) and the internal images (produced from the second training signals 310). The error can be measured based on a variety of criteria, such as least mean square error between pixel values.

Once the algorithm block 316B converges to a set of internal parameters, the internal neural network 316A is considered to have been trained, and these internal parameters become the parameters 340 that are provided to the first neural network 318. From this point on, the inferred depth and/or speed information contained in the test images 322 produced by the first neural network 318 may be of improved accuracy, despite the fact that the production sensors 304 themselves may not be as accurate as the reference sensors 302. The extent to which the inferred depth and/or speed information matches the corresponding ground truth values will depend on the vastness, variety and quality of the training data, as well as the complexity and sophistication of the neural network.

The first neural network 318 may also implement computer vision algorithms that use some or all of the second training signals 310 to further improve the accuracy of the test images 322. For example, where the perception system 300 is implemented in a vehicle, the first neural network 318 may contain a computer vision algorithm to calculate the self-motion of the vehicle (egomotion). Other computer vision algorithms may be used specifically to detect motion in passive sensor (camera) signals, or to strengthen the association between active measurements (e.g., from lidar) and the inferred depth and/or speed information. This may lead to faster convergence of the algorithm block 316B used for determining the parameters 340.

As such, once the parameters 340 of the first neural network unit 318 have been determined during the training phase (using the high-performance reference sensors 302), they can be used, together with the production sensors 304, to estimate or infer the RGBDV images in a real-time scenario. The production sensors 304, and the processing power needed for inference, may thus be more cost compatible with high-volume manufacturing, yet high accuracy might still be achieved, which may allow safer autonomous driving.

Figure 4:
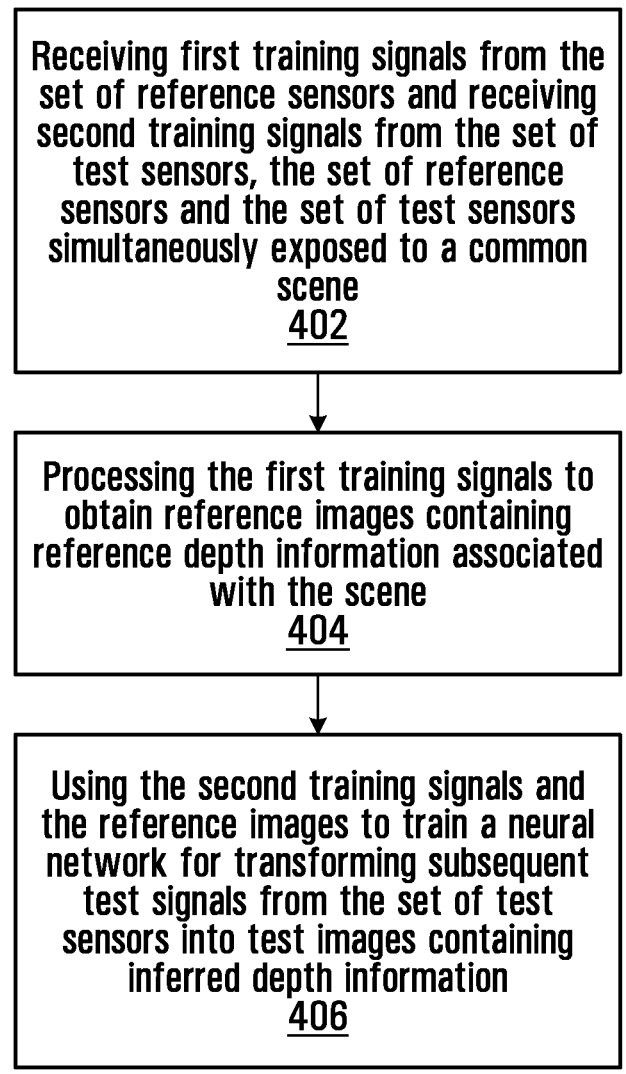
FIG. 4 is a flowchart illustrating steps in a method that may be carried out by elements of system of FIGS. 3A and 3B, in accordance with a non-limiting embodiment.

As such, there has been provided a system that comprises the set of reference sensors 302, the set of test sensors 304, the training unit 316 and the perception system 300. The training unit 316 and the perception system 300 may be implemented in a single computing device. With reference to FIG. 4, such computing device may be configured for: receiving first training signals from the set of reference sensors and receiving second training signals from the set of test sensors, the set of reference sensors and the set of test sensors simultaneously exposed to a common scene 402; processing the first training signals to obtain reference images containing reference depth information associated with the scene 404; and using the second training signals and the reference images to train a neural network for transforming subsequent test signals from the set of test sensors into test images containing inferred depth information 406.

Figure 5:
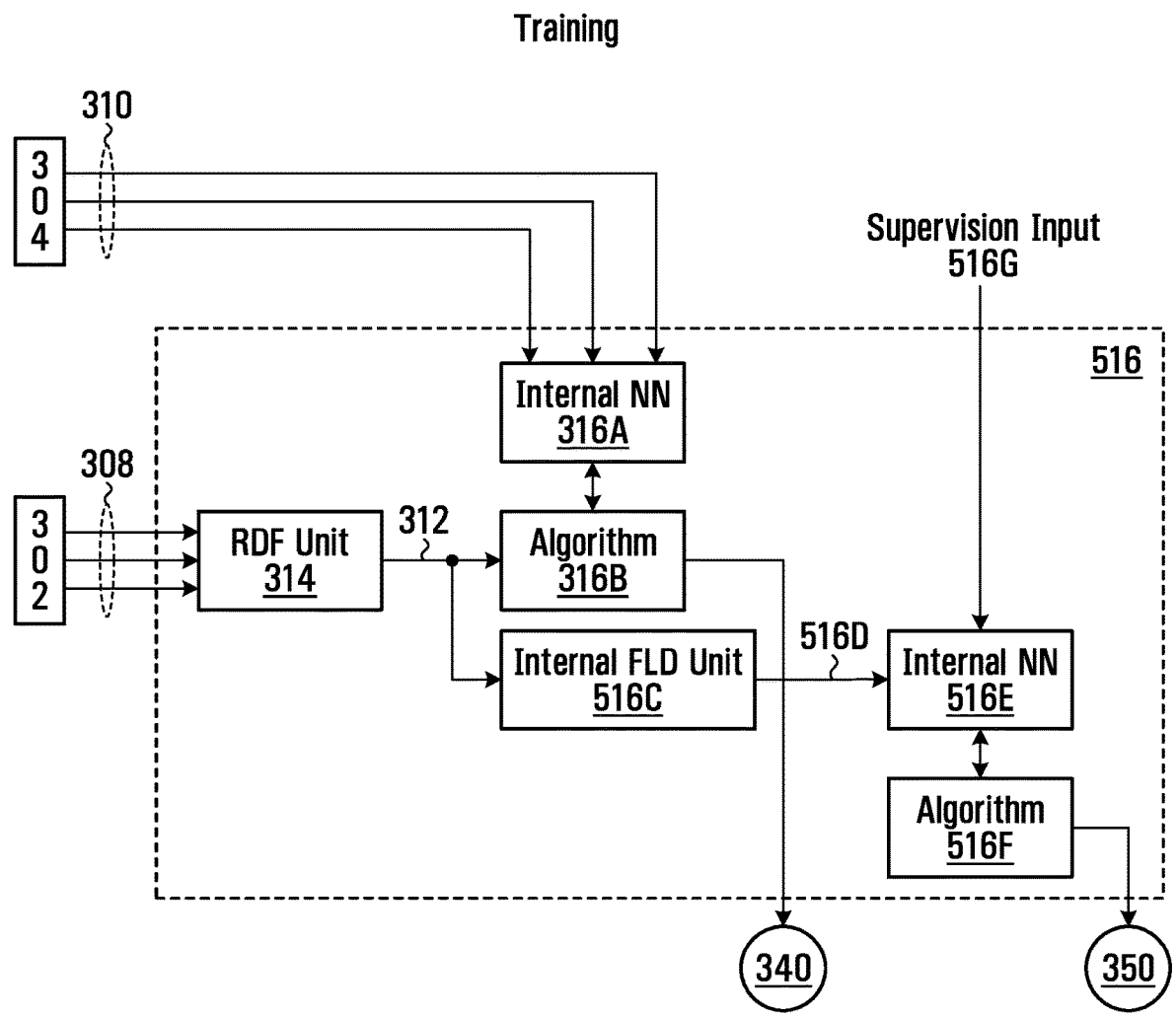
FIG. 5 is a block diagram of a training unit for training the perception system of FIG. 3A, in accordance with another non-limiting embodiment.

In some embodiments, the training unit 316 may be adapted to compute the set of parameters 350 for the second neural network 338. Accordingly, with reference to FIG. 5, there is shown an example training unit 516 for training the perception system 300. The training unit 516 is similar to the training unit 316 except that it includes additional elements or functionalities. In particular, the training unit 516 is configured to compute the second set of parameters 350 and to send it to the second neural network 338 of the perception system 300. To compute the second set of parameters 350, the training unit 516 is configured to process the reference images 312 with an internal first-level detection (FLD) unit 516C to create an internal object signal 516D. In particular, the internal FLD unit 516C can be identical to the FLD unit 324 in that it processes given ones of images it receives (in this case, reference images 312) to identify regions of interest (ROIs) in the images that contain unspecified objects meeting certain criteria (e.g., having a minimum height above the roadway).

The internal object signal 516D is processed by a second internal neural network 516E that has the same structure as the second neural network 338. As such, the second internal neural network 516E is configured to process the ROIs identified in the internal object signal 516D based on a set of internal parameters to detect and classify known objects in a scene. It should be understood that the second internal neural network 516E and the second neural network 338 need not be distinct neural networks, but rather may correspond to the same block of software code, which is referred to as the second internal neural network 516E during training and as the second neural network 338 during real-time use.

In an embodiment, the training unit 516 implements an algorithm block 516F that iteratively changes the internal parameters of the internal neural network 516E so as to minimize an error, such as the error between the detection classification results produced by the internal neural network 516E and ground truth detection and classification information as provided by a supervision input 516G. The error can be measured based on a variety of criteria, such as false positive rate or false negative rate.

Once the algorithm block 516F converges to a set of internal parameters, the internal neural network 516E is considered to have been trained, and the internal parameters become the second set of parameters 350 that are provided to the second neural network 338. From this point on, the classification and location information contained in the detection signal 330 and the classification signal 332 produced by the second neural network 338 may be considered reliable, even though the production sensors 304 themselves may not be as reliable as the reference sensors 302. The extent to which the classification and location information matches the corresponding ground truth values will depend on the vastness, variety and quality of the training data, as well as the complexity and sophistication of the neural network.

In some embodiments, the second neural network 338 is associated with a single second set of parameters 350, whereas in other embodiments, the second neural network 338 may be associated with plural second sets of parameters 350 for different conditions based on factors such as ambient light level and weather conditions, for example.

Those skilled in the art will appreciate that a neural network is often considered to be a "black box", as the internal workings may be complex and it may be difficult to explain how the neural network arrived at a decision. This may be unsatisfactory for a production system, especially a safety-critical production system. Instead, modules in safety-critical production systems should be able to report on their health or adjust themselves to changing conditions. In particular, it should be possible to determine whether a perception system (such as the perception system 300) is producing valid results, be it at the level of image generation or at the level of object detection and classification. One way to look at this problem is to consider the reference data used for training and to determine the extent to which the test data currently being fed to a given neural network for inference is similar to the reference data that was used. If there is a significant difference, the parameters associated with the neural network may not be reliable. This would be indicative of a lower confidence in the neural network's results, and an alarm may be signalled, or a different set of parameters may be chosen.

Figure 6A:
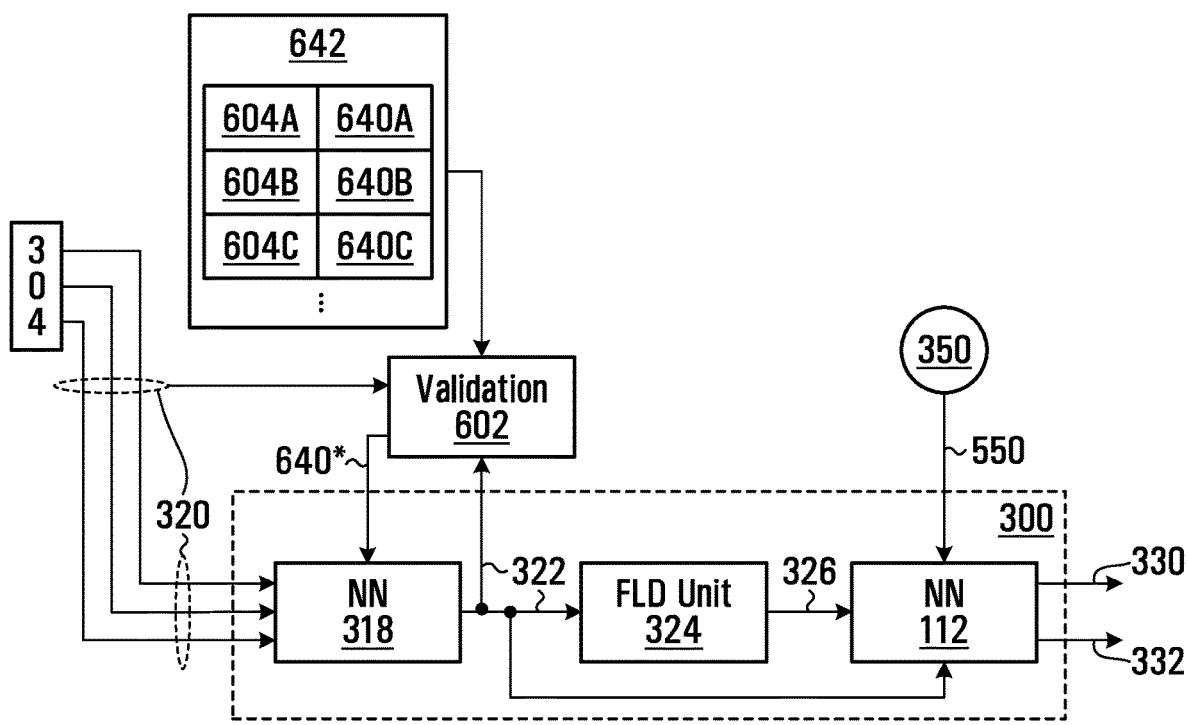
FIG. 6A is a block diagram of a perception system and a validation unit, in accordance with a non-limiting embodiment.
Figure 6B:
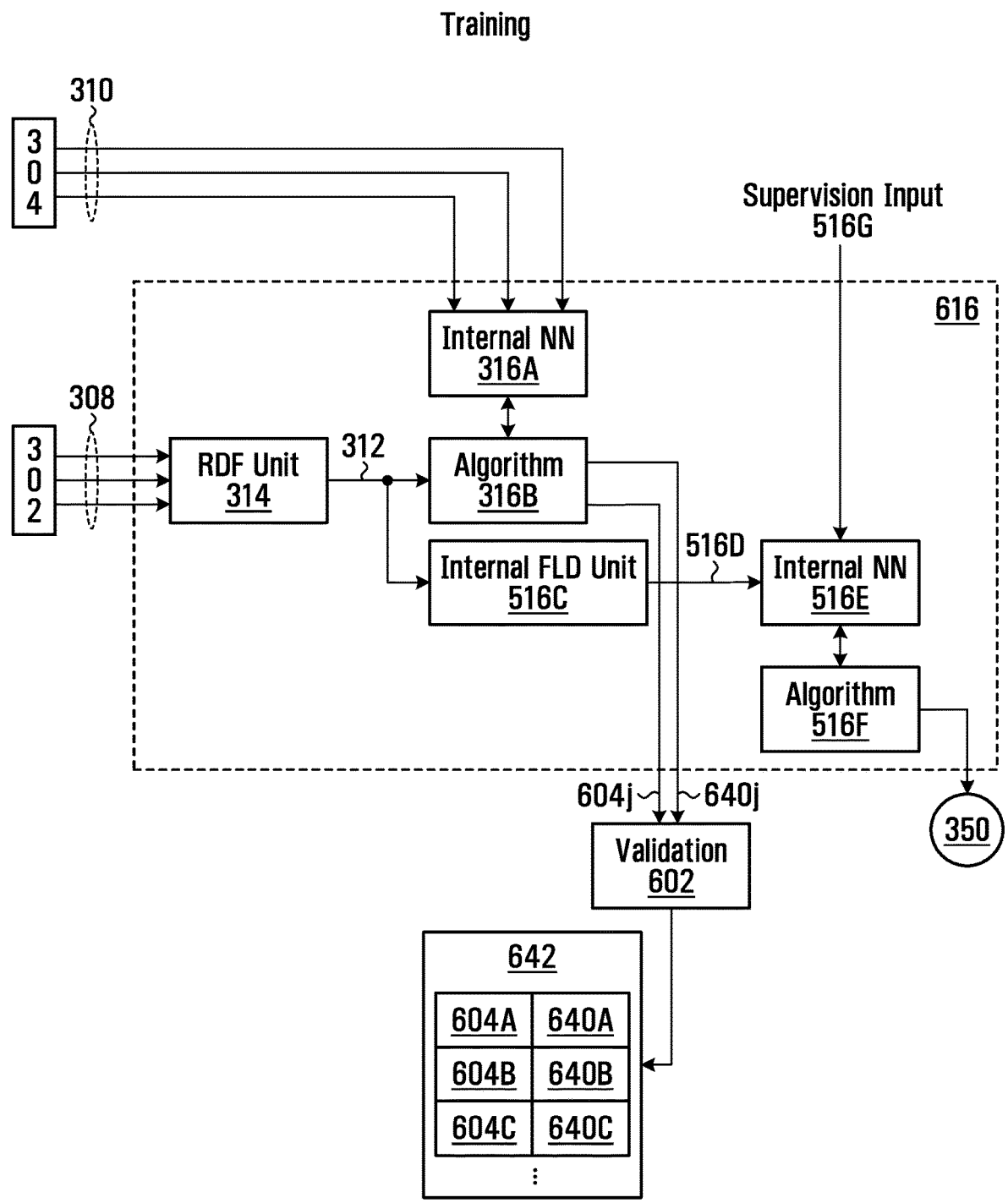
FIG. 6B is a block diagram of the validation unit of FIG. 6A and a training unit for training the perception system of FIG. 6A, in accordance with a non-limiting embodiment.

Accordingly, with reference to FIGS. 6A and 6B, a validation system 602 is provided for validating the performance of the perception system 300.

It is recalled that for the perception system 300, the first neural network 318 is used to transform the real-time signals 320 obtained from the set of production sensors 304 into test images 322 containing depth and/or speed information (e.g., RGBDV images or maps). The first neural network 318 is therefore still characterized by a set of parameters, but in this embodiment, these parameters are denoted 640* and are provided by the validation unit 602. That is to say, the validation unit 602 makes a decision as to the set of parameters 640* to be provided to the first neural network 318 for use in a real-time scenario. This decision can be based on a variety of factors.

In particular, and with reference to FIG. 6B, consider the training phase. During the training phase, the algorithm block 316B computes and keeps track of a set of "feature characteristics" 604j that characterize the prevailing environmental conditions (e.g., light, weather, motion, landscape, etc.) under which a set of parameters 640j is generated by the algorithm block 316B when training the internal neural network 316A (which corresponds to the first neural network 318 of the perception system 300).

The set of feature characteristics 604j can be determined by processing the second training signals 310 received from the production sensors 304 during the training phase and/or by processing the internal images produced by the internal neural network 316A during the training phase. In some embodiments, the feature characteristics may be of a statistical nature such as mean, standard deviation, maximum, or other statistics derived from the second training signals 310 and/or the internal images, possibly after post-processing. Examples of feature characteristics may include "average gray level", "average speed", "average distance", "average object speed" and "average object distance", to name a few non-limiting possibilities.

The set of feature characteristics 604j, which may be referred to as "reference feature characteristics", is stored in memory in association with the set of parameters 640j for which it has been generated. To represent the fact that there may be multiple training sub-phases, each with different prevailing environmental conditions, a table 642 is provided in which the sets of reference feature characteristics are denoted 604A, 604B, . . . and the associated sets of neural network parameters are denoted 604A, 604B, . . . . The validation unit 602 has access to the table 642. Of course, other ways of representing the relevant data and relationships exist and are within the scope of this disclosure.

During a real-time scenario, and with reference to FIG. 6A, the validation unit 602 is configured to compute analogous feature characteristics of the test signals 320 and/or the test images 322 produced by the first neural network 318. These feature characteristics are representative of the current prevailing environmental conditions and will be referred to as "test feature characteristics" to distinguish them from the reference feature characteristics. It should be noted that during the real-time scenario, the set of neural network parameters being used by the first neural network 318 are denoted by 640* in this embodiment, where 640* is selected from 640A, 640B, etc.

In operation, the validation unit 602 is tasked with assessing whether the set of neural network parameters 640* currently being used by the first neural network 318 is appropriate for the real-time environmental conditions to which the production sensors 304 are being exposed.

To this end, the validation unit 602 is configured for:
 obtaining the reference feature characteristics (i.e., 604*) associated with the current neural network parameters (i.e., 640*). This may be done by consulting the table 642.
 computing the test feature characteristics in real-time as mentioned above, based on the test signals 320 and/or the test images 322;
 carrying out a comparison of the test feature characteristics to the reference feature characteristics; and
 taking an action based on the comparison.

By way of non-limiting example, the comparison may involve computation of distance metrics between corresponding pairs of the feature characteristics (reference vs. test). The validation unit 602 then takes an action based on the comparison. For example, if the distance metrics are below a certain threshold, the validation unit 602 may conclude that the current set of parameters 640* used by the first neural network 318 is appropriate for the real-time scene to which the production sensors 304 are being exposed, and no specific further action may be required. However, if one or more distance metrics is above the threshold, the validation unit 602 may conclude that the current set of parameters 604* used by the first neural network 318 is not appropriate for the scene to which the production sensors 304 are being exposed. In this case, further action may be required, such as triggering an alarm.

In a more advanced version of the comparison step, the validation unit 602 may compare the test feature characteristics, in parallel or in sequence, with each set of reference feature characteristics 604A, 604B, . . . associated with respective sets of parameters 640A, 640B, . . . . This would allow the validation unit 602 to choose the most appropriate set of parameters to be fed to the first neural network 318 as the set of parameters 640*. In other words, selection of the set of parameters 640* may be based on a comparison of the feature characteristics of the current environment versus all previous environments for which training has been carried out and has yielded a separate set of parameters 640A, 640B, . . . .

Those skilled in the art will appreciate that the aforementioned system and/or method may use the feature characteristics as an anchor. Specifically, during real-time operation, the method and/or system is configured to monitor the feature characteristics, and determine when the training set (i.e., the data used for training the first neural network 318) is invalid.

Figure 7:
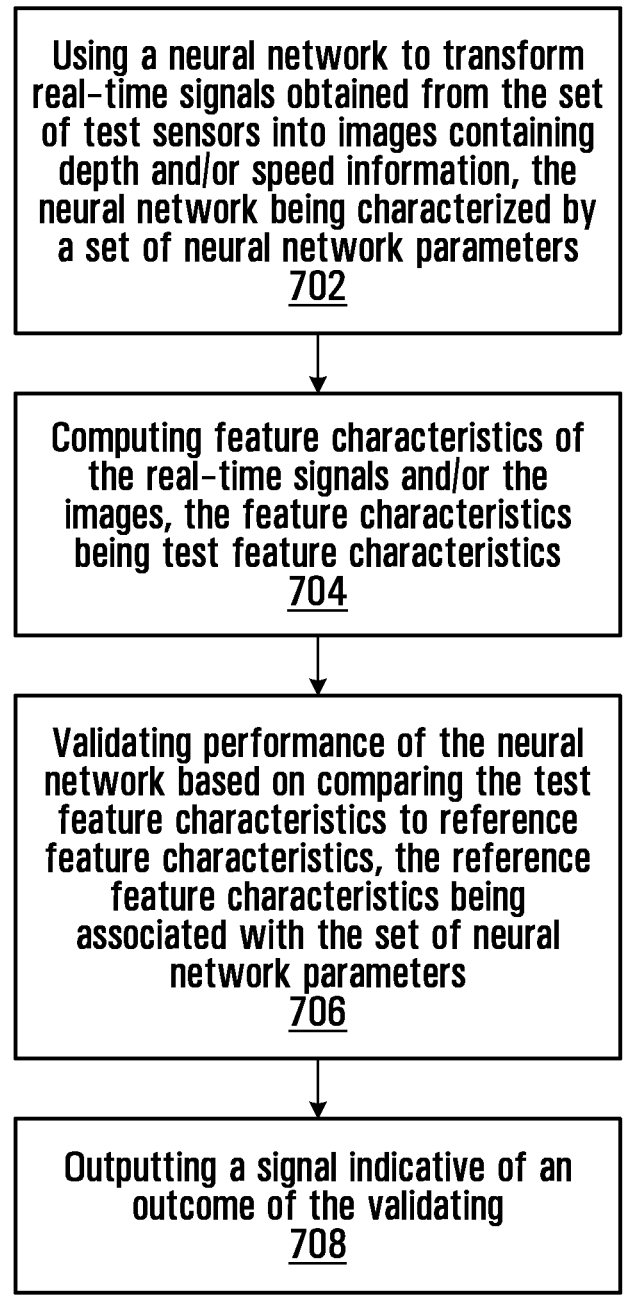
FIG. 7 is a flowchart illustrating steps in a method that may be carried out by elements of system of FIGS. 6A and 6B, in accordance with a non-limiting embodiment.

As such, there has been provided a system that comprises a set of test sensors and a computing device that implements a perception system, a training unit and a validation unit. With reference to FIG. 7, the computing device may be configured for: using a neural network to transform real-time signals obtained from the set of test sensors into images containing depth and/or speed information, the neural network being characterized by a set of neural network parameters 702; computing feature characteristics of the real-time signals and/or the images, the feature characteristics being test feature characteristics 704; validating performance of the neural network based on comparing the test feature characteristics to reference feature characteristics, the reference feature characteristics being associated with the set of neural network parameters 706; and outputting a signal indicative of an outcome of the validating 708.

In a variant, the second set of parameters associated with the second neural network 338 can also be validated based on an assessment of whether the current conditions match those that were present during a training phase for determining the second set of parameters.

Figure 8B:
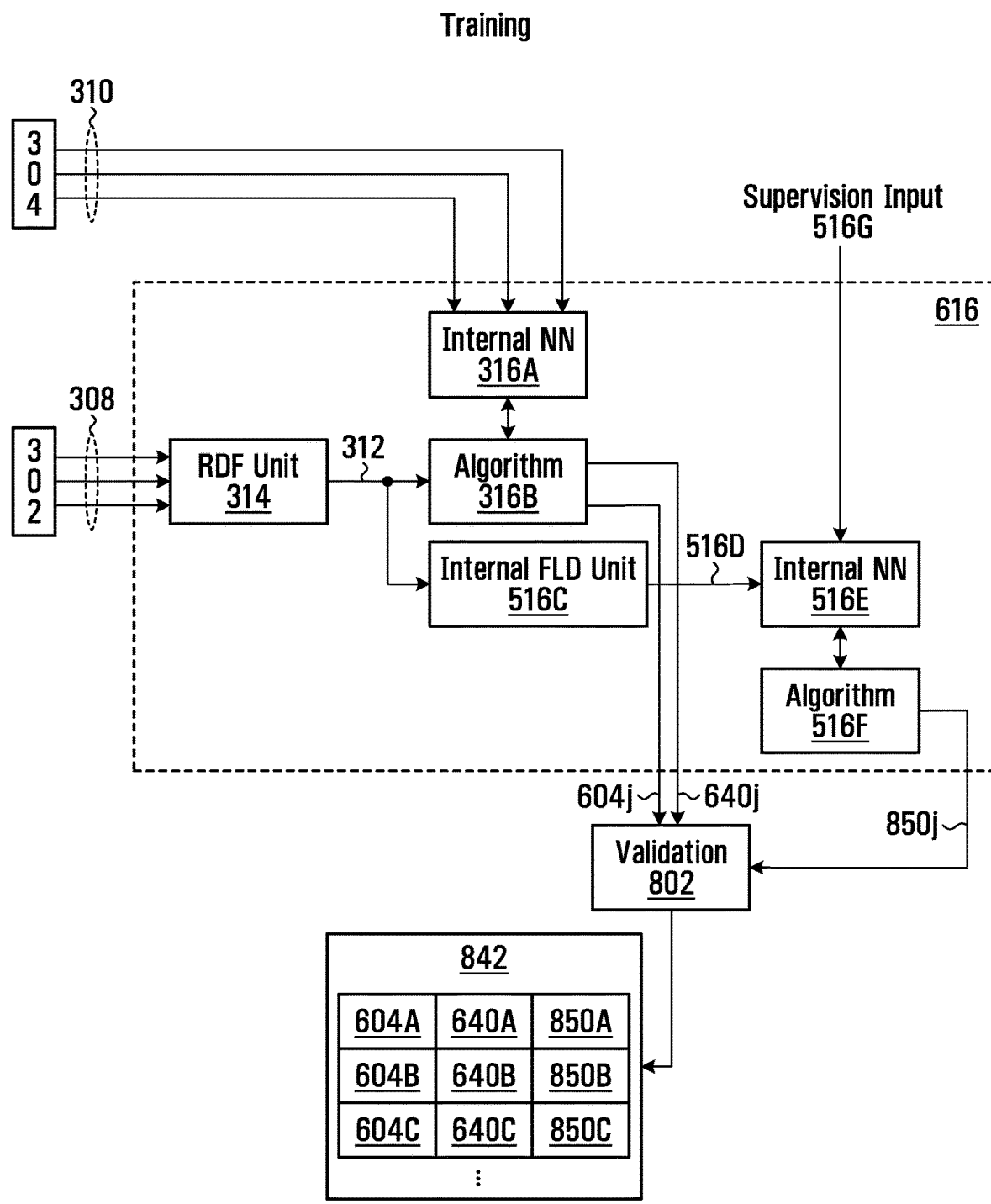
FIG. 8B is a block diagram of the validation unit of FIG. 8A and a training unit for training the perception system of FIG. 8A, in accordance with a non-limiting embodiment.

Accordingly, with reference to FIGS. 8A and 8B, a validation system 802 is provided for validating the performance of the perception system 300.

It is recalled that for the perception system 300, the second neural network 338 is configured for processing the object signal 326 from the FLD unit 324, based on the test images 322, to produce the detection signal 330 and the classification signal 332. In particular, the second neural network 338 is configured to process the ROIs identified in the object signal 326 using a second set of parameters obtained during a training phase for detecting and classifying known objects in a scene.

As such, the second neural network 338 is still characterized by a set of parameters, but in this embodiment, the parameters used by the second neural network 338 are denoted 850* and are provided by the validation unit 802. That is to say, the validation unit 802 makes a decision as to which is the set of parameters 850* to be provided to the second neural network 338 for use in a real-time scenario. This decision may be based on a variety of factors.

In particular, with reference to FIG. 8B, consider the training phase for the first and second internal neural networks 316A and 516E. During the training phase, the algorithm block 316B computes and keeps track of a set of "feature characteristics" 604$j$ of the prevailing environmental conditions (e.g., light, weather, motion, landscape, etc.) under which (i) the set of first parameters 640$j$ is generated by the algorithm block 316B when training the internal neural network 316A and (ii) a set of second parameters 850$j$ is generated by the algorithm block 316F when training the internal neural network 316E.

The aforementioned set of feature characteristics 604$j$ can be determined by processing the second training signals 310 received from the production sensors 304 during the training phase and/or by processing the internal images produced by the internal neural network 316A during the training phase. In some embodiments, the feature characteristics may be of a statistical nature such as mean, standard deviation, maximum, or other statistics derived from the second training signals 310 and/or the internal images. Examples of feature characteristics may include "average gray level", "average vehicle speed", "average vehicle distance", to name a few non-limiting possibilities.

The set of feature characteristics 604$j$ ($j$=A, B, . . . ), also referred to as the set of "reference feature characteristics", is stored in memory in association with the first set of parameters 640$j$ ($j$=A, B, . . . ) and the second set of parameters 850$j$ ($j$=A, B, . . . ). To represent the fact that there may be multiple training phases, each with different prevailing environmental conditions, a table 842 is provided in which the sets of reference feature characteristics are denoted 604A, 604B, . . . , the associated first sets of parameters (for the first neural network 318) are denoted 640A, 640B, . . . , and the associate second sets of parameters (for the second neural network 338) are denoted 850A, 850B, . . . . The validation unit 802 has access to the table 842. Of course, other ways of representing the relevant data and relationships exist and are within the scope of this disclosure.

Similar to what has been previously described with respect to the validation unit 602, the validation unit 802 is configured to compute analogous feature characteristics of the test signals 320 and/or the test images 322 produced by the first neural network 318 during real-time operation. These feature characteristics are representative of the current prevailing environmental conditions and will be referred to as "test feature characteristics" to distinguish them from the reference feature characteristics. It should be noted that during operation, in this embodiment, the set of neural network parameters being used by the first neural network 318 are denoted by 640* and the set of neural network parameters being used by the second neural network 338 are denoted by 850*, where 640* is one of 640A, 640B, etc. and where 850* is one of 850A, 850B, etc.

In operation, the validation unit 802 is tasked with assessing whether the set of neural network parameters 640* currently used by the first neural network 318 is appropriate for the real-time environmental conditions to which the production sensors 304 are being exposed. This has already been described in the context of the validation unit 602. In addition, the validation unit 802 is tasked with assessing whether the set of neural network parameters 850* currently used by the second neural network 338 is appropriate for the real-time environmental conditions to which the production sensors 304 are being exposed.

To this end, the validation 802 is configured for:
  obtaining the reference feature characteristics (i.e., 604*) associated with the current second set of neural network parameters (i.e., 850*). This may be done by consulting the table 842.
  computing the test feature characteristics in real-time as mentioned above, based on the test signals 320 and/or the test images 322;
  carrying out a comparison of the test feature characteristics to the reference feature characteristics;
  taking an action based on the comparison.

By way of non-limiting example, the comparison may involve computation of distance metrics between corresponding pairs of the feature characteristics (reference vs.

test). The validation unit 802 then takes an action based on the comparison. For example, if the distance metrics are below a certain threshold, the validation unit 802 may conclude that the current second set of parameters 850*used by the second neural network 338 is appropriate for the scene to which the production sensors 304 are being exposed, and no specific further action may be required. However, if one or more distance metrics is above the threshold, the validation unit 802 may conclude that the current second set of parameters 850*used by the second neural network 338 is not appropriate for the scene to which the production sensors 304 are being exposed. In this case, further action may be required, such as triggering an alarm.

It is noted that validation unit 802 may conclude that the current second set of parameters 850*used by the second neural network 338 is not appropriate for the scene to which the production sensors 304 are being exposed, but that the current first set of parameters 640*used by the first neural network 318 is appropriate, or vice versa.

In a more advanced version of the comparison step, the validation unit 802 may compare the test feature characteristics, in parallel or in sequence, with each set of reference feature characteristics 604A, 604B, . . . associated with respective second sets of parameters 850A, 850B, . . . . This would allow the validation unit 802 to choose the most appropriate second set of parameters to be fed to the second neural network 338 as the parameters 850*. In other words, selection of the parameters 850*may be based on a comparison of the feature characteristics of the current environment versus all previous environments for which training has been carried out and has yielded a separate second set of parameters 850A, 8506, . . . .

Those skilled in the art will appreciate that the aforementioned system and/or method may use the feature characteristics as an anchor. Specifically, during real-time operation, the method and/or system is configured to monitor the feature characteristics, and determine when the training set (i.e., the data used for training the second neural network 338) is invalid.

Those skilled in the art will also appreciate that validation is a process by which it is determined to what extent a system or method performs as specified. Validation may be contemplated when a vehicle is put in a new scenario, environment, geographical setting, for regulators, certification, or after new software installation.

A neural-network-based perception scheme may require creating a labelled data set for validation, which may be a costly and time-consuming procedure. Alternatively, the use of reference sensors (i.e., ground truth sensors) and production sensors may make the validation process more efficient. In particular, two parallel perception systems may be implemented in a test scenario, one based reference data from the reference sensors and the other based on test data from the production sensors. The results can be compared, and performance of the test data can be measured relative to the reference data. Validation thus provides an assessment as to whether performance is good enough for the test scenario.

Figure 9:
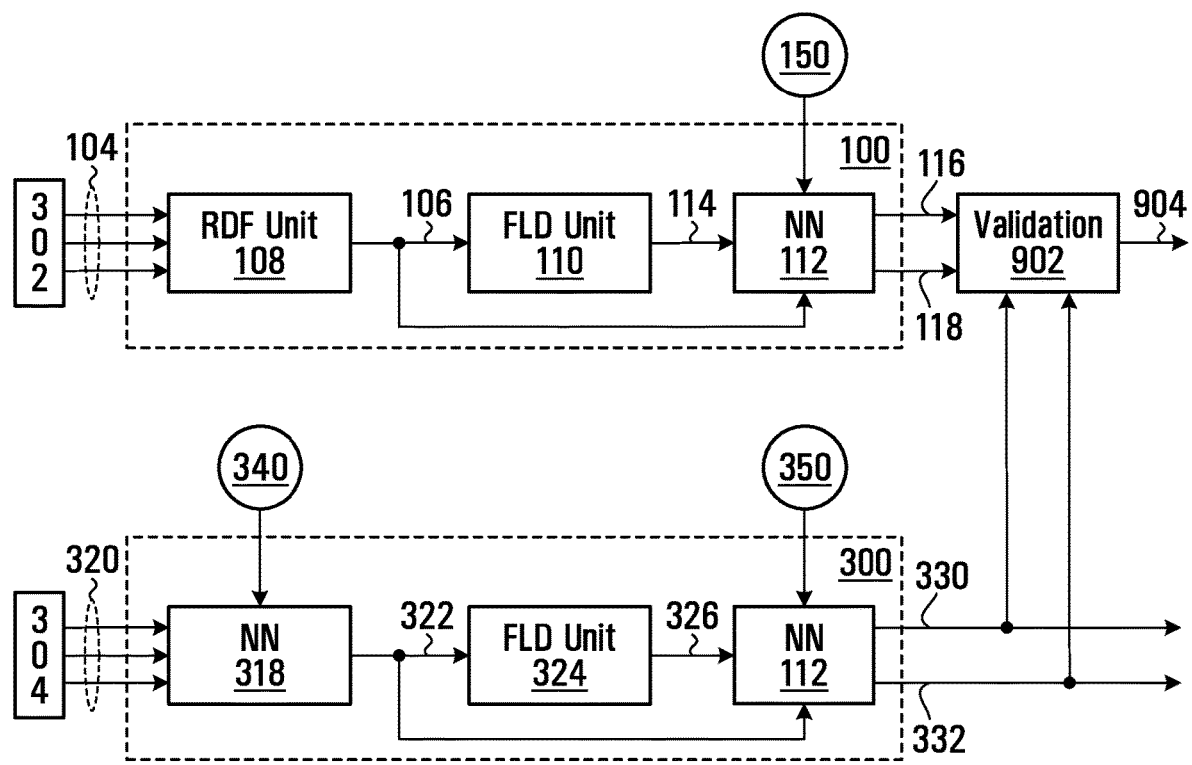
FIG. 9 is a block diagram of two perception systems and a validation unit, in accordance with a non-limiting embodiment.

Accordingly, reference is now made to FIG. 9, in which there is shown an environment for validating the results of the perception system 300 using the perception system 100.

In particular, it will be recalled that the perception system 100 comprises:
an RDF unit 108 configured for transforming signals obtained from a set of first sensors (i.e., reference sensors 302) into reference data 106 including first images that contain depth information;
an FLD unit 110 configured for processing the first images to identify regions of interest that contain unspecified objects meeting certain criteria. These regions of interest may be conveyed in a signal 114;
a neural network 112 configured to process the signal 114 so as to carry out detection and classification of known objects in the regions of interest of the first images.

It will also be recalled that the perception system 300 comprises:
a first neural network 318 configured for transforming signals obtained from a set of second sensors (i.e., production sensors 304) into test data 322 including second images containing depth information;
an FLD unit 324 configured to process the second images to identify regions of interest that contain unspecified objects meeting said criteria. These regions of interest may be conveyed in a signal 326;
a second neural network 338 configured to process the signal 326 so as to carry out second detection and classification of known objects in the regions of interest of the second images.

Based on outcomes of the first detection and classification carried out by the perception system 100 (as represented by the detection signal 116 and the classification signal 118) and the second detection and classification carried out by the perception system 300 (as represented by the detection signal 330 and the classification signal 332), the validation unit 902 is configured to validate performance of perception system 300 (and, in particular, the performance of the first neural network 328 and/or the second neural network 338).

By way of non-limiting example, the comparison may involve computation of distance metrics between corresponding sets of detection results. The validation unit 902 then takes an action based on the comparison. For example, if the distance metrics are below a certain threshold, the validation unit 902 may conclude that the sets of parameters currently being used by the first and second neural networks 318, 338 of the perception system 300 are appropriate for the scene to which the production sensors 304 are being exposed, and no specific further action may be required. However, if one or more distance metrics is above the threshold, the validation unit 902 may conclude that the set of parameters currently used by the first neural network 318 and/or the second neural network 338 is/are not appropriate for the scene to which the production sensors 304 are being exposed. In this case, further action may be required, such as triggering an alarm.

Figure 10:
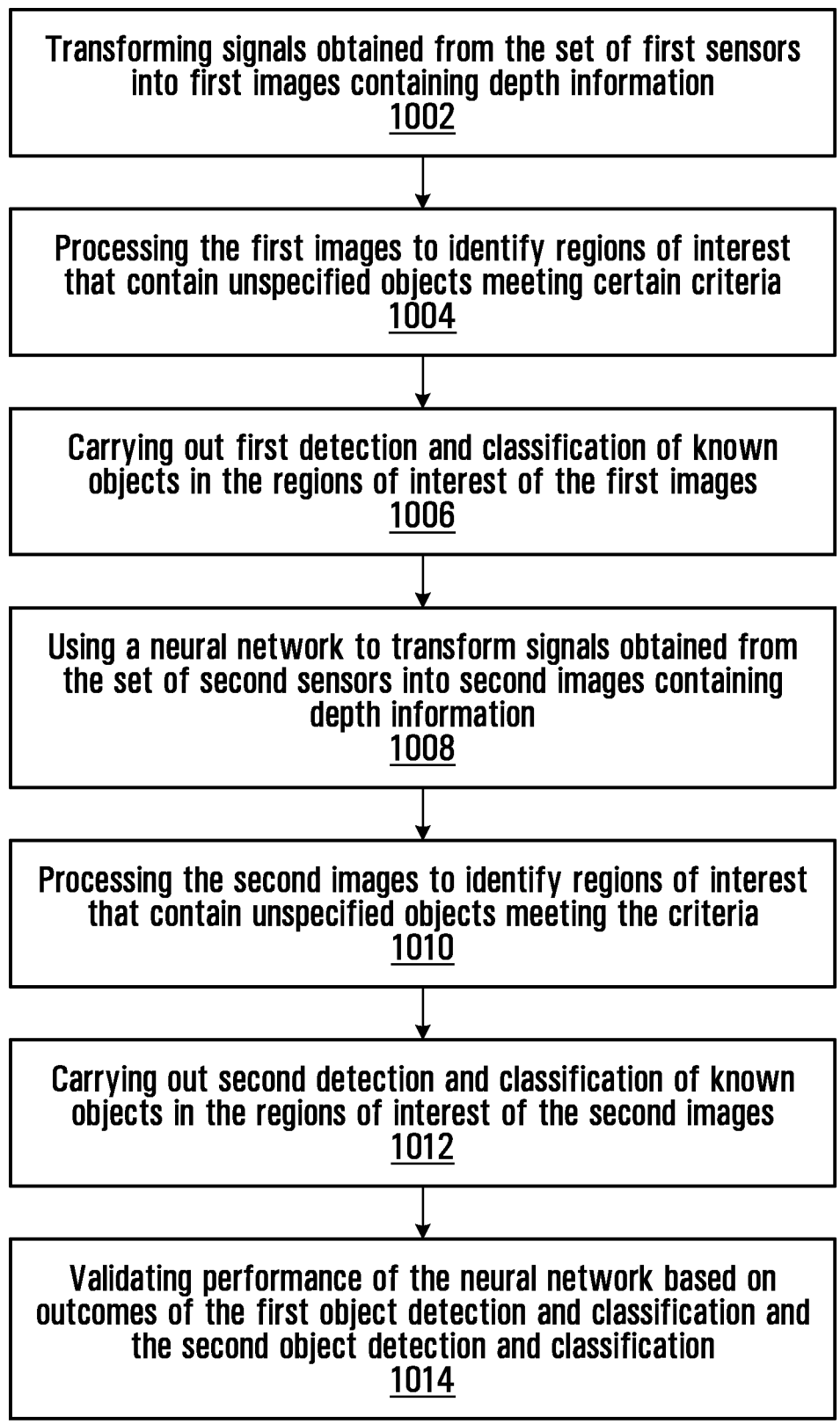
FIG. 10 is a flowchart illustrating steps in a method that may be carried out by elements of system of FIG. 9, in accordance with a non-limiting embodiment.

As such, there has been provided a first perception system operatively coupled to a set of first sensors, a second perception system operatively coupled to a set of second sensors, a validation unit. Part or all of the first perception system, the second perception system and the validation unit may be implemented by a computing device. With reference to FIG. 10, the computing device may be configured for: transforming signals obtained from the set of first sensors into first images containing depth information 1002; processing the first images to identify regions of interest that contain unspecified objects meeting certain criteria 1004; carrying out first detection and classification of known objects in the regions of interest of the first images 1006; using a neural network to transform signals obtained from the set of second sensors into second images containing depth information 1008; processing the second images to identify regions of interest that contain unspecified objects meeting the criteria 1010; carrying out second detection and classification of known objects in the regions of interest of the second images 1012; and validating performance of the neural network based on outcomes of the first object detection and classification and the second object detection and classification 1014.

Those skilled in the art will appreciate that the neural networks referred to in this disclosure may take on a variety of forms in different embodiments, including Perceptrons, Convolutional Neural Networks, Recurrent Neural Networks, Long/Short Term Memory, Gated Recurrent Units, Hopfield Networks, Boltzmann Machines, Deep Belief Networks, Autoencoders and Generative Adversarial Networks, to name a few non-limiting possibilities.

Those skilled in the art will appreciate that the perception systems described in the present disclosure may be applicable to a variety of commercial applications, including autonomous, semi-autonomous or assisted land vehicles of various types (wheeled or tracked), ships, underwater vehicles, airborne vehicles (such as drones) and space vehicles. Such vehicles may be manned or unmanned, and may carry passengers or cargo. The perception systems may be mobile or fixed relative to a terrestrial reference point.

Any reference to a system should be applied, mutatis mutandis to a method that is executed by a system and/or to a computer program product that stores instructions that once executed by the system will cause the system to execute the method.

Any reference to method should be applied, mutatis mutandis to a system that is configured to execute the method and/or to a computer program product that stores instructions that once executed by the system will cause the system to execute the method.

Any reference to a computer program product should be applied, mutatis mutandis to a method that is executed by a system and/or a system that is configured to execute the instructions stored in the non-transitory computer readable medium.

Any reference to a communication channel or a communication unit may include any type of communication link and/or channels such as wireless or wired, direct link or indirect link, cellular communication, satellite communication, Wi-Fi communication, and the like.

Any reference to a computerized system refers to one or more computers that includes at least one hardware processor, hardware memory unit and the like.

The term "and/or" is additionally or alternatively.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. Multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, implementation of certain features or embodiments is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

Certain embodiments may also be implemented in a computer program product that is non-transitory that stores instructions that may form a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

[0086] The computer program may be stored internally on a computer program product that is non-transitory. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Figure 11:
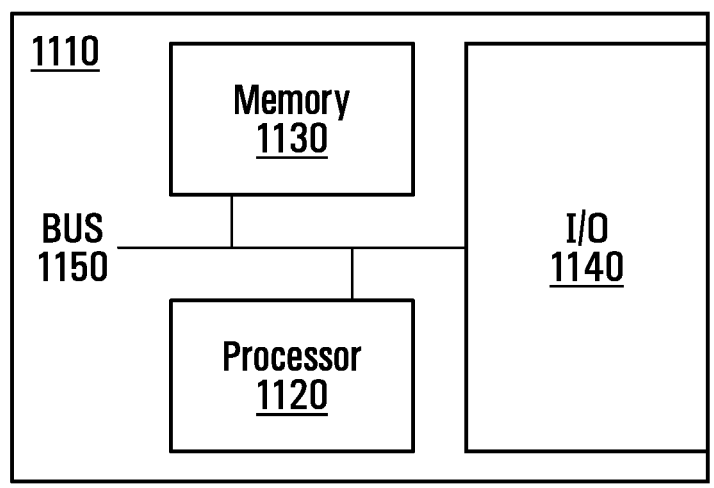
FIG. 11 is a block diagram of a computing device that may be used to implement various methods and systems described herein.

FIG. 11 is a block diagram of a computing apparatus, which can be representative of a computing device 1110 used for implementing one or more of the above functions. The computing apparatus 1110 comprises a comprises a processor 1120 and a memory 1130 storing computer-readable instructions that are read and executed by the processor 1120, thereby causing the processor 1120 to carry out various methods and processes. An I/O 1140 receives sensor signals and outputs signals from the computing device. A bus 1150 may allow interconnection of the processor 1120, memory 1130 and network I/O 1140.

As described herein, a "computer implemented method" should not necessarily be inferred as being performed by a single computing device such that the steps of the method may be performed by more than one cooperating computing device.

Certain embodiments may employ devices conforming to various network standards and for various applications, including, for example other WLAN standards and other wireless standards. This may be the case with the reference sensors 102 and the production sensors 104, which may send their outputs via wired or wireless technologies. In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

It is appreciated that throughout the specification discussions utilizing terms such as "processing", "computing", "calculating", "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors. The methodologies described herein are, in one exemplary embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Furthermore, a computer-readable carrier medium may form, or be included in a computer program product. A computer program product can be stored on a computer usable carrier medium, the computer program product comprising a computer readable program means for causing a processor to perform a method as described herein.

Reference throughout this specification to "one embodiment," "exemplary embodiment," or "an embodiment" means that a particular feature, structure or characteristic described in connection with the embodiment is included in at least one embodiment of the present invention. Thus, appearances of the phrases "in one embodiment," "in an exemplary embodiment," or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments. Similarly it should be appreciated that, in the above description of example embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects may lie in less than all features of a single foregoing disclosed embodiment. Thus, the claims following the Detailed Description are hereby expressly incorporated into this Detailed Description, with each claim standing on its own as a separate embodiment. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

However, other modifications, variations and alternatives are also possible. The specification and drawings are, accordingly, to be regarded in an illustrative rather than in a restrictive sense.

Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

In the foregoing specification, the invention has been described with reference to specific examples of embodiments. It will, however, be evident that various modifications and changes may be made therein without departing from the scope of the invention as set forth in the appended claims.

What is claimed is:

1. A computer-implemented method, comprising:
  receiving first training signals from a set of reference sensors and receiving second training signals from a set of test sensors, the set of reference sensors and the set of test sensors simultaneously exposed to a common scene;
  processing the first training signals to obtain reference images containing reference depth information associated with said scene;
  using the second training signals and the reference images to train a neural network for transforming subsequent test signals from the set of test sensors into test images containing inferred depth information, wherein the set of reference sensors comprises at least a first lidar sensor and the set of test sensors comprises at least a second lidar sensor, the first lidar sensor having a higher resolution, a greater range or a wider field of view, than the second lidar sensor.

2. The method of claim 1, wherein the neural network is characterized by a set of parameters, the method further comprising obtaining the set of parameters by training the neural network.

3. The method of claim 2, wherein the parameters comprise weights and/or bias values.

4. The method of claim 1, wherein the test images and the reference images are RGBDV images.

5. The method of claim 1, wherein the set of test sensors differs from the set of reference sensors.

6. The method of claim 1, wherein the set of test sensors is a subset of the set of reference sensors.

7. The method of claim 1, wherein the set of test sensors and the set of reference sensors are of different types.

8. The method of claim 1, wherein the test sensors consume less power than the reference sensors.

9. The method of claim 1, wherein the set of reference sensors comprises at least a lidar sensor and a non-lidar sensor.

10. The method of claim 9, wherein processing the first training signals to obtain the reference images comprises carrying out raw data fusion on the first training signals from the lidar sensor and the non-lidar sensor.

11. The method of claim 1, wherein the set of reference sensors includes a lidar sensor and wherein the set of test sensors includes a radar sensor but no lidar sensor.

12. The method of claim 1, wherein the test sensors are for mounting to a vehicle.

13. The method of claim 1, further comprising determining an estimated location of the test sensors relative to the scene, wherein the neural network is configured to take into account said estimated location.

14. The method of claim 1, wherein the reference images further contain reference speed information associated with said scene and wherein the test images further contain inferred speed information.

15. A computer-implemented method, comprising using a neural network to transform test signals from a set of test sensors into test images containing inferred depth information, the neural network having been trained in accordance with a computer-implemented method comprising:
   receiving first training signals from a set of reference sensors and receiving second training signals from the set of test sensors, the set of reference sensors and the set of test sensors simultaneously exposed to a common scene;
   processing the first training signals to obtain reference images containing reference depth information associated with said scene; and
   using the second training signals and the reference images to train the neural network for transforming subsequent test signals from the set of test sensors into the test images containing the inferred depth information;
   wherein the set of reference sensors comprises at least a first lidar sensor and the set of test sensors comprises at least a second lidar sensor, the first lidar sensor having a higher resolution and a greater range or a wider field of view than the second lidar sensor.

16. The method of claim 15, the neural network being a first neural network, the method further comprising:
   processing given ones of the test images to identify regions of interest in the given ones of the test images that contain an unspecified object meeting certain criteria;
   processing the identified regions of interest using a second neural network trained to detect and classify known objects; and
   outputting an object descriptor and an indication of a location within the given ones of the test images of the objects detected and classified by the second neural network.

17. The method of claim 16, wherein the scene comprises a roadway and wherein the criteria comprises the unspecified object being present on the roadway.

18. The method of claim 17, wherein the criteria further comprises the unspecified object having a height greater than a predetermined minimum height.

19. The method of claim 16, wherein the indication of the location of an object detected and classified by the second neural network comprises a bounding box within the image.

20. The method of claim 16, wherein the object descriptor for an object detected and classified by the second neural network comprises an object class.

* * * * *